(12) United States Patent
Takei et al.

(10) Patent No.: US 6,334,336 B1
(45) Date of Patent: Jan. 1, 2002

(54) VACUUM DEGASSING APPARATUS FOR MOLTEN GLASS AND METHOD FOR BUILDING IT

(75) Inventors: Yusuke Takei, Tokyo; Michito Sasaki; Masataka Matsuwaki, both of Kanagawa; Shigekuni Inoue, Kanagawa; Atsushi Tanigaki, Kanagawa; Mitsuo Sugimoto, Kanagawa, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/326,543

(22) Filed: Jun. 7, 1999

(30) Foreign Application Priority Data

Jun. 24, 1998 (JP) .............................. 10-177164

(51) Int. Cl.[7] .......................... C03B 5/225; C03B 5/425; C03B 5/43
(52) U.S. Cl. .......................... 65/134.2; 65/157; 65/347
(58) Field of Search ..................... 65/134.2, 134.4, 65/157, 374.13, 347

(56) References Cited

U.S. PATENT DOCUMENTS

| | | |
|---|---|---|
| 1,598,308 A | 8/1926 | Pike |
| 3,519,412 A | 7/1970 | Olink |
| 3,708,600 A * | 1/1973 | Nickel et al. ............... 373/156 |
| 5,316,563 A | 5/1994 | Ishimura et al. |
| 5,849,058 A | 12/1998 | Takeshita et al. |
| 5,851,258 A | 12/1998 | Ando et al. |
| 6,119,484 A * | 9/2000 | Takei et al. ............... 65/134.2 |
| 6,202,445 B1 * | 3/2001 | Sugimoto et al. ......... 65/134.2 |

FOREIGN PATENT DOCUMENTS

| | | |
|---|---|---|
| EP | 0 908 417 | 4/1999 |
| JP | 2-221129 | 9/1990 |
| JP | 3-33020 | 2/1991 |
| JP | 3-69516 | 3/1991 |
| JP | 4-31325 | 2/1992 |
| JP | 5-58646 | 3/1993 |
| JP | 5-208830 | 8/1993 |
| JP | 5-208845 | 8/1993 |
| JP | 5-229831 | 9/1993 |
| JP | 6-305735 | 11/1994 |
| WO | 91/17402 | * 11/1991 |

* cited by examiner

*Primary Examiner*—Sean Vincent
(74) *Attorney, Agent, or Firm*—Oblon, Spivak, McClelland, Maier & Neustadt, P.C.

(57) ABSTRACT

A vacuum degassing apparatus comprises a path made of dense refractory bricks, the path including an inner surface brick layer, the refractory bricks in the inner surface brick layer having a flatness of 0.5 mm on contacting surfaces with one anther, and the path including a backup brick layer and a ramming material filling layer besides the inner surface brick layer.

9 Claims, 3 Drawing Sheets

VACUUM DEGASSING APPARATUS FOR MOLTEN GLASS AND METHOD FOR BUILDING IT

The present invention relates to a vacuum degassing apparatus for molten glass, which removes bubbles from molten glass continuously supplied, and a method for building the apparatus.

In order to improve the quality of formed glass products, there has been used a vacuum degassing apparatus which removes bubbles generated in a molten glass before the molten glass that has been molten in a melting tank is formed by a forming apparatus, as shown in FIG. 4.

The vacuum degassing apparatus 110 shown in FIG. 4 is used in a process wherein molten glass G in a melting vessel 120 is vacuum-degassed and is continuously supplied to a subsequent treatment vessel. In the vacuum degassing apparatus are provided a vacuum housing 112 which is evacuated to be depressurized therein for vacuum-degassing the molten glass, a vacuum degassing vessel 114 which is provided in the vacuum housing 112 and is depressurized together with the vacuum housing, and an uprising pipe 116 and a downfalling pipe 118 which are connected to respective end portions of the vacuum degassing vessel in a downward and vertical direction. The uprising pipe 116 has a lower end immersed in the molten glass G in an upstream pit 122 in communication with the melting vessel 120. Likewise, the downfalling pipe 118 has a lower end immersed in the molten glass G in a downstream pit 124 in communication with the subsequent treatment vessel (not shown).

The vacuum degassing vessel 114 is substantially horizontally provided in the vacuum housing 112 which is evacuated through a suction port 112c by a vacuum pump, not shown, to be depressurized therein. Since the inside of the vacuum degassing vessel 114 is depressurized, through suction ports 114a and 114b in communication with the inside of the vacuum housing 112, to a pressure of $\frac{1}{20}$–$\frac{1}{3}$ atmosphere together with the inside of the vacuum housing 112, the molten glass G in the upstream pit 122 before degassing is sucked and drawn up by the uprising pipe 116, and is introduced into the vacuum degassing vessel 114. After the molten glass has been vacuum-degassed in the vacuum degassing vessel 114, the molten glass is drawn down by the downfalling pipe 118 to be discharged into the downstream pit 124.

The vacuum housing 112 may be a casing made of metal, such as stainless steel and heat-resisting steel. The vacuum housing is evacuated by the vacuum pump, not shown, for instance, to be depressurized therein, maintaining the inside of the vacuum degassing vessel 114 provided therein in a depressurized state, such as a pressure of $\frac{1}{20}$–$\frac{1}{3}$ atmosphere. In the vacuum degassing vessel 114 is formed an upper space 114s above the molten glass which has been filled at a certain depth in the vacuum degassing vessel.

Around the vacuum degassing vessel 114, the uprising pipe 116 and the downfalling pipe 118 in the vacuum housing 112 is provided thermal insulation material 130, such as refractory bricks, to cover these members for thermal insulation.

Since the conventional vacuum degassing apparatus 110 is configured to deal with the molten glass G having a high temperature, such as a temperature at 1,200–1,400° C., paths for molten glass in direct contact with the molten glass G, such as the vacuum degassing vessel 114, the uprising pipe 116 and the downfalling pipe 118, are constituted by circular shells, which are made of noble metal, such as platinum and platinum alloy, as shown in JP-A-2221129 in the name of the applicants.

The reason why the paths for molten glass, such as the vacuum degassing vessel 114, the uprising pipe 116 and the downfalling pipe 118, are made of noble metal, such as platinum and platinum alloy, is that there is no inclusion of impurities into the molten glass G and a certain strength is ensured at high temperatures since it is hardly possible due to low reactivity of the noble metal with the molten glass at a high temperature that, when the noble metal contacts the molten glass G at such a high temperature, the noble metal elutes by reaction with the molten glass G.

When the vacuum degassing vessel 114 is constituted by a circular shell made of noble metal, an increase in the wall thickness of the shell directly and significantly rises the cost since noble metal such as platinum is quite expensive. From this viewpoint, the diameter of the circular shell is limited to a certain value in terms of cost and strength, and it is difficult to significantly increase the diameter of the circular shell. This creates a problem in that the quantity of the molten glass G to be vacuum-degassed in the vacuum degassing vessel 114 is limited to a certain level, and that it is impossible to build the vacuum degassing apparatus so as to have a large throughput.

Since the molten glass G is obtained by dissolution reaction of powders raw material, it is preferable that the temperature in the melting vessel 120 is high in dissolution. Since the viscosity of the molten glass G decreases at high temperatures, it is preferable that the temperature of the molten glass is high in vacuum-degassing. Although the conventional vacuum degassing apparatus requires to use alloy with noble metal included therein in the vacuum degassing vessel 114 and the like in terms of high temperature strength, it is difficult to increase the wall thickness of the circular shells in terms of cost because noble metal is expensive. Even if noble metal, such as platinum, is used, the strength thereof inevitably lowers as the temperature becomes higher. As a result, the temperature of the molten glass at an inlet of the vacuum degassing apparatus 110 has been limited to the certain temperature (1,200–1,400° C.) as stated earlier.

When the paths for the molten glass having a high temperature are made of platinum, the formation of holes due to wearing of the thin platinum must be taken into account in designing, and the apparatus is required to be configured so as to enable to repair and replacement of platinum for a short period of time after the production of glass products has been temporarily standstill. Since the paths made of platinum (the vacuum degassing vessel, the uprising pipe and the downfalling pipe) in the conventional vacuum degassing apparatus are provided in series, repair and replacement of the paths has required to release the depressurized state and expel all the molten glass from the inside of the vacuum vessel, the uprising pipe and the downfalling pipe, to drop the temperature of the entire vacuum apparatus to an ordinary temperature, and then to carry out repair or replacement of platinum. Since it is appropriate that the molten glass is cut at the lower ends of the uprising and downfalling pipes for repair or replacement of platinum, the vacuum degassing apparatus has been required to have a structure that the entire apparatus can be lifted by at least 1 m to separate the uprising and downfalling pipes from the high temperature glass reservoirs thereunder when, in particular, the uprising pipe and the downfalling pipe are repaired. However, lifting the entire vacuum degassing apparatus 110 has required an extremely difficult operation since the apparatus is large and extremely heavy in consideration of the operation at a high temperature and in the depressurized state.

As stated earlier, it is difficult to provide the apparatus in a large size in terms of cost since platinum or platinum rhodium, which has low reactivity at high temperatures, is expensive. Even if the apparatus is build in a large size, it is impossible to provide the circular shells with a sufficient wall thickness. As a result, it is impossible to obtain strength required to resist heat. This prevents the temperature of the molten glass from being raised, making it difficult to decrease the viscosity of the molten glass so as to exhibit a vacuum-degassing effect in a sufficient way. Since the provision of an insufficient wall thickness needs repair or replacement required by wearing, accompanied by difficult operation, it is practically difficult to build the apparatus in a large size and to provide the apparatus with a large throughput.

In order to cope with this problem, a proposal is made to build the vacuum degassing apparatus in a large size and to increase the vacuum-degassing amount by using refractory brick to constitute the vacuum degassing vessel 114, the uprising pipe 116 and the downfalling pipe 118 in the conventional vacuum degassing apparatus 110 shown in FIG. 4. However, it is absolutely impossible to build each of the vacuum degassing vessel 114, the uprising pipe 116 and the downfalling pipe 118 by a single piece of refractory brick since there are limitations on preparation of refractory brick in a large size. In order to build each of the vacuum degassing vessel 114, the uprising pipe 116 and the downfalling pipe 118 in the vacuum degassing apparatus 110 by refractory brick, many pieces of refractory brick are required to be combined. This inevitably provides joints, in the paths in direct contact with the molten glass, which connect pieces of refractory brick.

When the vacuum degassing vessel 114, the uprising pipe 116 and the downfalling pipe 118 in the vacuum degassing apparatus 110 are made of refractory brick, the use of dense refractory brick, such as electro-cast refractory material, as the refractory brick in direct contact with the molten glass is considered since some components inevitably elute into the molten glass from the refractory brick in direct contact with the molten glass. Even if denser refractory brick is used as the refractory brick to be used in these members, there are created problems in that the molten glass leaks through a gap at a joint to dissolve and erode backup refractory brick or thermal insulation material behind the dense refractory brick, thereby causing the components thereof dissolved into the molten glass to degrade the quality of products, and that, even if the degree of erosion in the dense refractory brick is small, the backup refractory brick or the thermal insulation material is eroded by the molten glass to shorten the life of the vacuum degassing apparatus 110 in per se.

In order to cope with this problem, it is considered to fill jointing material in joints between pieces of refractory brick forming the paths in direct with the molten glass. However, there is created a problem in that the joint material in direct contact with the molten glass is easily eroded in comparison with refractory brick since the joint material is generally less dense in comparison with the refractory brick, in particular dense refractory brick, and that, even if the degree of erosion in the refractory brick in per se is small, the erosion in joints between pieces of refractory brick selectively develops. Although the life of the vacuum degassing apparatus is slightly lengthened in comparison with lack of joint material in the joints, the backup refractory brick or the thermal insulation material behind the dense refractory brick is dissolved and eroded as stated earlier after erosion of the joint material, creating problems in that the quality of products degrades and the life of the vacuum degassing apparatus 110 in per se becomes shorter.

It is an object of the present invention to solve these problems, and to provide a vacuum degassing apparatus for molten glass capable of being used in a long period of time by preventing or restraining molten glass from leaking through a joint between pieces of refractory brick in direct contact with the molten glass or by preventing backup refractory material or thermal insulation refractory material from being eroded even if the molten glass leaks through the joint, and to provide a method for building the apparatus as well. In order to decrease the building cost of the apparatus and improve the design freedom of the apparatus to provide the apparatus with a large throughput, the apparatus has a vacuum degassing vessel, an uprising pipe and a downfalling pipe constituted by combining inexpensive refractory bricks in comparison with noble metal such as platinum and noble alloy.

In order to attain the object, the present invention, as a first mode, provides a vacuum degassing apparatus for molten glass, comprising a vacuum housing which is evacuated to be depressurized therein; a vacuum degassing vessel which is provided in the vacuum housing to vacuum-degas molten glass; an uprising pipe which connects to the vacuum degassing vessel, and sucks and draws up undegassed molten glass to introduce the undegassed molten glass into the vacuum degassing vessel; and a downfalling pipe which connects to the vacuum degassing vessel and draws down the degassed molten glass from the vacuum degassing vessel to discharge the degassed molten glass; wherein paths in direct contact with the molten lo glass are made of assembled dense refractory bricks, the paths providing the vacuum degassing vessel, at least one portion of the uprising pipe and at lease one portion of the downfalling pipe, and the bricks have a flatness of not greater than 0.5 mm on contacting surfaces with adjoining dense refractory bricks.

It is preferable that an inner surface brick layer has a flatness of not greater than 0.25 mm on the contacting surfaces with adjoining dense refractory bricks.

It is preferable that the dense refractory material is at least one of at least one electro-cast refractory material among alumina based electro-cast refractory material, zirconia based electro-cast refractory material and alumina-zirconia-silica based electro-cast refractory material, and at least one dense burned refractory material among dense alumina based refractory material, dense zirconia-silica based refractory material and dense alumina-zirconia-silica based refractory material.

The present invention, as a second mode, provides a vacuum degassing apparatus for molten glass, comprising a vacuum housing which is evacuated to be depressurized therein; a vacuum degassing vessel which is provided in the vacuum housing to vacuum-degas molten glass; an uprising pipe which connects to the vacuum degassing vessel, and sucks and draws up undegassed molten glass to introduce the undegassed molten glass into the vacuum degassing vessel; and a downfalling pipe which connects to the vacuum degassing vessel and draws down the degassed molten glass from the vacuum degassing vessel to discharge the degassed molten glass; wherein each of the vacuum degassing vessel, at least one portion of the uprising pipe and at lease one portion of the downfalling pipe includes an inner surface brick layer made of assembled dense refractory bricks and forming a path in direct contact with the molten glass, at least one backup brick layer provided behind the inner brick layer and made of assembled refractory bricks, and a ramming material layer provided in at least a space between the inner surface layer and the backup brick layer adjoining thereto and filled with ramming material.

It is preferable that at least two backup brick layers are provided and that a ramming layer with the ramming material filled therein is provided at a space between the adjoining backup brick layers.

It is preferable that at least a space between the inner surface brick layer and the backup brick layer adjoining thereto has a size of 20–50 mm.

It is preferable that the inner surface brick layer and the at least one backup brick layer are made of the bricks assembled so that joints with adjoining bricks in one brick layer do not overlap with joints with adjoining bricks in the other brick layer by a length greater than that of the joints in the other brick layer.

It is preferable that the refractory bricks forming the backup brick layer are dense refractory bricks.

It is preferable that the ramming material is at least one or a mixture of two among alumina based ramming material, zirconia-silica based ramming material, and alumina-zirconia-silica based ramming material.

It is preferable that the ramming material has a water content of 3 to 15 wt % used for kneading thereof.

It is preferable that the bricks in the inner surface layer have a flatness of not greater than 0.5 mm, particularly 0.25 mm on contacting surfaces with adjoining dense refractory bricks.

It is preferable that the dense refractory brick is at least one of at least one electro-cast refractory material among alumina based electro-cast refractory material, zirconia based electro-cast refractory material and alumina-zirconia-silica based electro-cast refractory material, and at least one dense burned refractory material among dense alumina based refractory material, dense zirconia-silica based refractory material and dense alumina-zirconia-silica based refractory material.

The present invention, as a third mode, provides a method for building a vacuum degassing apparatus for molten glass, comprising a vacuum housing which is evacuated to be depressurized therein; a vacuum degassing vessel which is provided in the vacuum housing to vacuum-degas molten glass; an uprising pipe which connects to the vacuum degassing vessel, and sucks and draws up undegassed molten glass to introduce the undegassed molten glass into the vacuum degassing vessel; and a downfalling pipe which connects to the vacuum degassing vessel and draws down the degassed molten glass from the vacuum degassing vessel to discharge the degassed molten glass; wherein each of paths in series that comprise the vacuum degassing vessel, at least one portion of the uprising pipe and at lease one portion of the downfalling pipe is provided by polishing contacting surfaces of dense refractory bricks with adjoining dense refractory bricks to provide a flatness of not greater than 0.5 mm on the contacting surfaces, assembling the polished bricks to provide each of the paths in direct contact with the molten glass as the vacuum degassing vessel, the at least one portion of the uprising pipe and the at least one portion of the downfalling pipe, heating the paths to a certain temperature to elute vitreous substance from the dense refractory bricks, and filling spaces between the contacting surfaces of the adjoining bricks with the vitreous substance.

The present invention, as a fourth mode, provides a method for building a vacuum degassing apparatus for molten glass, comprising a vacuum housing which is evacuated to be depressurized therein; a vacuum degassing vessel which is provided in the vacuum housing to vacuum-degas molten glass; an uprising pipe which connects to the vacuum degassing vessel, and sucks and draws up undegassed molten glass to introduce the undegassed molten glass into the vacuum degassing vessel; and a downfalling pipe which connects to the vacuum degassing vessel and draws down the degassed molten glass from the vacuum degassing vessel to discharge the degassed molten glass; wherein among paths in series which comprise the vacuum degassing vessel, at least one portion of the uprising pipe and at lease one portion of the downfalling pipe, portions of the paths in direct contact with the molten glass are provided with an inner surface brick layer made of assembled dense refractory bricks, at least one backup brick layer made of assembled refractory bricks is provided behind the inner surface brick layer so as to be spaced from the inner surface brick layer by a certain distance, and ramming material with a small amount of water kneaded therewith is filled in at least a space between the inner surface brick layer and the backup brick layer, being subjected to vibration by a vibrator.

It is preferable that the inner surface brick layer is provided by polishing contacting surfaces of the dense refractory bricks with adjoining dense refractory bricks to provide a flatness of not greater than 0.5 mm on the contacting surfaces, assembling the polished bricks to provide each of the paths in direct contact with the molten glass as the vacuum degassing vessel, the at least one portion of the uprising pipe and the at least one portion of the downfalling pipe, heating the paths to a certain temperature to elute vitreous substance from the dense refractory bricks, and filling spaces between the contacting surfaces of the adjoining bricks with the vitreous substance.

Now, the vacuum degassing apparatus for molten glass and the method for building the apparatus according to the present invention will be described in detail in reference to an appropriate embodiment shown in the accompanying drawings.

Figure 1:
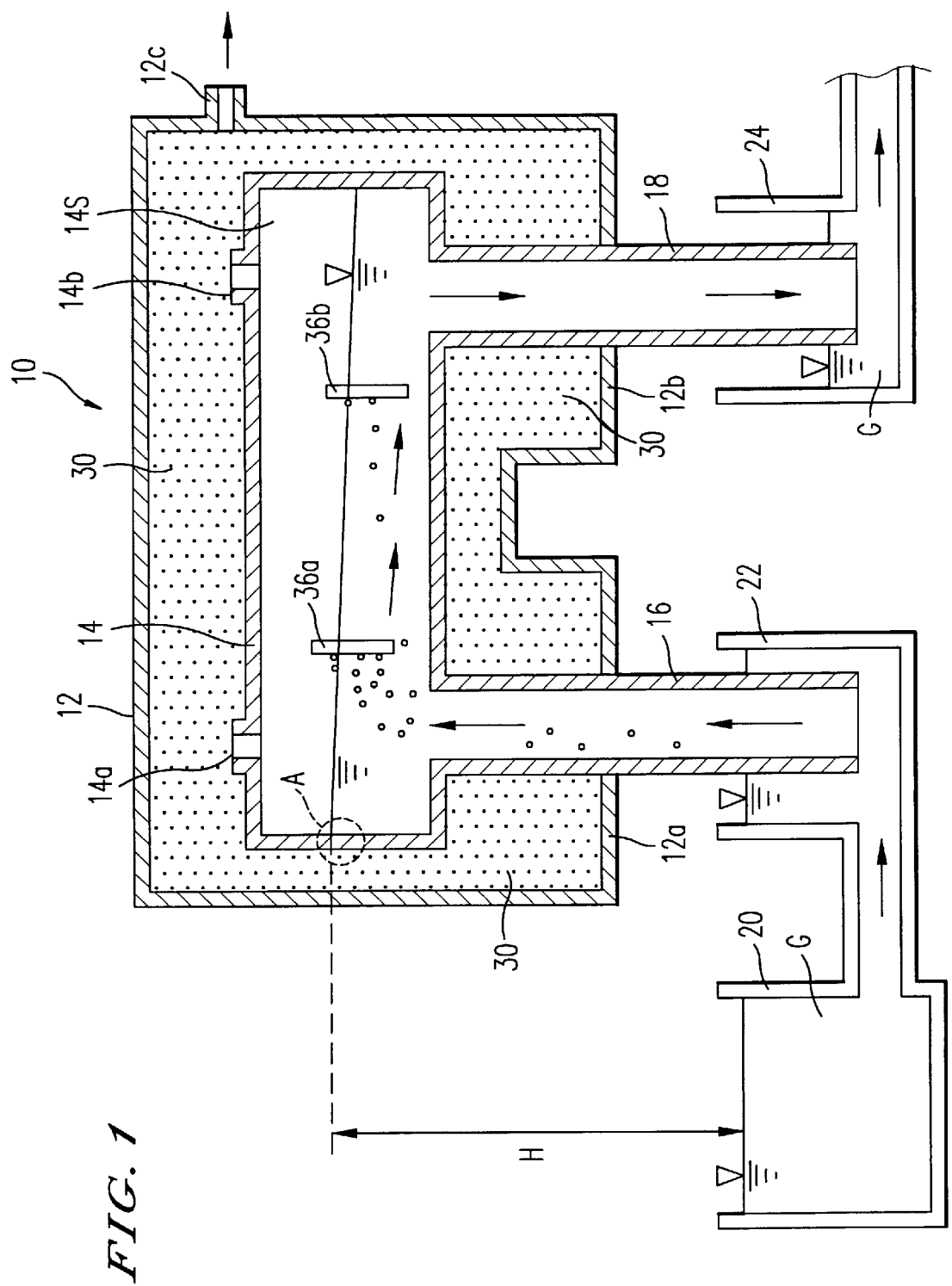
FIG. 1 is a schematic cross-sectional view of the vacuum degassing apparatus for molten glass according to an embodiment of the present invention.

In FIG. 1 is shown a schematic cross-sectional view of the vacuum degassing apparatus 10 for molten glass according to the embodiment of the present invention. The vacuum degassing apparatus 10 comprises a vacuum housing 12 made of stainless steel and formed in a substantially rectangular arched shape, a vacuum degassing vessel 14 horizontally housed in the vacuum housing 12 and having a rectangular sectional shape, and an uprising pipe 16 and a downfalling pipe 18 vertically housed in the vacuum housing 12 and having respective upper ends connected to right and left end portions of the vacuum degassing vessel 14.

The vacuum degassing apparatus 10 is used in a process wherein molten glass G in a melting vessel 20 is vacuum-degassed and the degassed molten glass is continuously supplied to a subsequent treatment vessel, not shown, such as a forming treatment vessel for plate material like a floating bath, and a forming treatment vessel for bobbles.

The vacuum housing 12 works as a casing (pressure vessel) to maintain airtightness when depressurizing the vacuum degassing vessel 14. In the shown embodiment, the vacuum housing is formed in a substantially rectangular arched shape. The vacuum housing 12 includes, at regions outside the vacuum degassing vessel 14, the uprising pipe 16 and the downfalling pipe 18, thermal insulation material 30, which insulates high temperatures from the molten glass G and which has an air-permeable property to provide no bar to evacuation in the vacuum degassing vessel 14. There are no limitations on the material and the structure of the vacuum housing 12 as long as the vacuum housing has an airtight property and a strength required for the vacuum degassing vessel 14. The vacuum housing is preferably made of metal, in particular stainless steel or heat-resisting steel.

The vacuum housing 12 has an upper right-hand portion thereof formed with a suction port 12c to evacuate the vacuum housing so as to depressurize the inside of the vacuum housing. A vacuum pump, not shown, is used to evacuate the vacuum housing 12 to depressurize the inside thereof, depressurizing the inside of the vacuum degassing vessel 14 provided at a substantially central portion in the vacuum housing to a certain pressure, such as a pressure of $1/20-1/3$ atmosphere, and maintaining the reduced pressure in the vacuum degassing vessel.

The vacuum housing 12 has the vacuum degassing vessel 14 provided in the substantially central portion thereof in a horizontal direction. There are no limitations on the sectional shape of a path in the vacuum degassing vessel 14. Although the sectional shape may be circular, for instance, it is preferable that the sectional shape is rectangular to vacuum-degas the molten glass G in a large quantity. The sectional shape is preferably rectangular in terms of formation of dense refractory bricks forming the vacuum degassing vessel 14, such as electro-cast refractory bricks and dense burned refractory bricks, as well.

The uprising pipe 16 has the upper end connected to the left end portion of the vacuum degassing vessel 14, the downfalling pipe 18 has the upper end connected to the right end portion of the vacuum degassing vessel 14, and the respective pipes extend in a vertical and downward direction. The uprising pipe 16 and the downfalling pipe 18 are provided so as to extend through respective legs 12a and 12b of the vacuum housing 12 formed in the substantially rectangular shape. The uprising pipe 16 and the downfalling pipe 18 have respective lower ends immersed in the molten glass G at a lower level than the liquid level of the molten glass G in an upstream pit 22 and a downstream pit 24 formed as a ditch.

The vacuum degassing vessel 14 has an upper portion formed with suction ports 14a, 14b in communication with the inside of the vacuum housing 12 in order to depressurize the inside of the vacuum housing 14 to the certain pressure (a pressure of $1/20-1/3$ atmosphere) and maintain the reduced state therein by evacuating the vacuum housing 12 through the suction port 12c by the use of the vacuum pump or the like, not shown. The vacuum degassing vessel 14 includes a barrier 36a and a barrier 36b to block bubbles rising in the molten glass G and enhance breakage thereof.

Respective portions between the vacuum degassing vessel 14, the uprising pipe 16 and the downfalling pipe 18, and the vacuum housing 12 are filled with the thermal insulating material 30, such as refractory bricks, for thermal insulation. Thus, the vacuum degassing apparatus 10 has a sectional structure constituted by the metallic vacuum housing 12, the thermal insulation material 30 made of refractory bricks, and the vacuum degassing vessel 14 (including the uprising pipe 16 and the downfalling pipe 18) combined by dense refractory bricks and forming paths in direct contact with the molten glass G in that order from outside about the paths for the molten glass G.

The paths in series provided by the vacuum degassing vessel 14, the uprising pipe 16 and the downfalling pipe 18 are the essential features of the present invention, and detailed explanation of the paths will be made later on. In a preferred mode of the present invention, an inner surface brick layer, which is assembled by dense refractory bricks formed in a certain shape and having surfaces polished with good precision, forms a path in direct contact with the molten glass G, at least one refractory brick layer is provided as a backup brick layer behind the inner surface brick layer, and ramming material is filled in a space between the respective brick layers to form a ramming material layer, providing a multi-layered sectional structure.

Figure 2A:
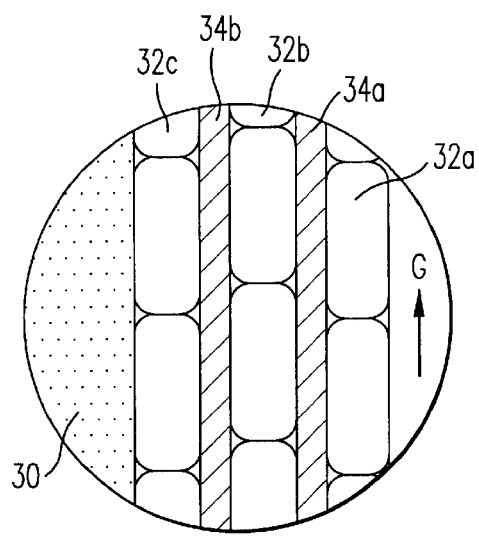
FIG. 2(A) is a cross-sectional view of a portion of a wall forming paths in series according to the embodiment.
Figure 2B:
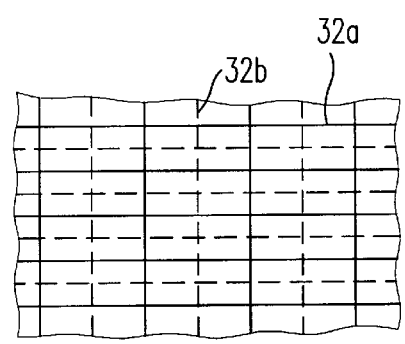
FIG. 2(B) is a schematic view showing joints in an inner wall surface of a path according to the embodiment.

The multi-layered structure of a wall of the paths in series provided by the vacuum degassing vessel 14, the uprising pipe 16 and the downfalling pipe 18 as the features of the present invention is shown in FIG. 2(A), and an inner wall surface of the paths is schematically shown in FIG. 2(B).

As shown in FIG. 2(A), the walls of the paths have a three-layered sectional structure that is constituted by the inner surface brick layer 32a made of assembled dense refractory bricks and forming an inner wall surface of a path in direct contact with the molten glass G, a first backup brick layer 32b provided behind the inner surface brick layer 32a so as to be spaced therefrom by, e.g., 20–50 mm and made of assembled refractory bricks to back up the inner surface brick layer 32a, a second backup brick layer 32c provided behind the first backup brick layer 32b in the same way as the first backup brick layer, and ramming material layers 34a and 34b, respectively, provided by ramming material filled in between the respective brick layers 32a, 32b and in between the respective brick layers 32b, 32c. A space between the second backup brick layer 32c and the vacuum housing 12 is filled with the thermal insulation material 30 made of refractory bricks.

The dense refractory bricks (hereinbelow, referred to as the dense bricks) that are used to form at least the paths in direct contact with the molten glass G in the vacuum degassing vessel 14, the uprising pipe 16 and the downfalling pipe 18 as a series of paths according to the present invention are bricks that are formed in a certain shape to be matched with the shape of the paths so as to combine the bricks as the inner surface brick layer 32a forming at least the path in direct contact with the molten glass G in each of the vacuum degassing vessel, the uprising pipe and the downfalling pipe. Any dense refractory bricks may apply as long as the bricks have a high density, elution of the bricks into the molten glass G does not degrade the quality of products due to coloration or heterogeneity for instance, preferably the reaction of the bricks with the molten glass G is small, and the bricks are difficult to be eroded by the molten glass. Examples of dense refractory material to be used for preparation of such dense bricks are electro-cast refractory material and dense burned refractory material.

Any dense electro-cast refractory material may apply as the electro-cast refractory material for the present invention. The electro-cast refractory material is preferably dense electro-cast refractory material that has a high bulk density and can maintain evacuation in the vacuum degassing vessel in spite of even the presence of closed pores therein because of an extremely small porosity, preferably almost 0 of porosity, in cast surfaces thereof. Examples of the electro-cast refractory material are zirconia based electro-cast refractory material, alumina based electro-cast refractory material, aluminazirconia-silica (AZS; $Al_2O_3$—$ZrO_2$—$SiO_2$) based electro-cast refractory material.

On the other hand, examples of the dense burned refractory material are dense zirconia-silica based burned refractory material, such a dense zircon having a dense structure, dense aluminum based burned refractory material, such as dense alumina, and dense alumina-zirconia-silica based burned refractory material.

First, the vacuum degassing apparatus 10 according to the fist mode of the present invention will be described.

In this mode, the dense bricks which form the inner surface brick layer 32a as a path in direct contact with the molten glass G have a flatness of not greater than 0.5 mm, preferably 0.25 mm, on contacting surfaces with adjoining dense bricks, and the dense bricks are spaced from the adjoining dense bricks by a gap of not greater than 1 mm, preferably 0.5 mm.

In the present invention, the flatness D is defined as follows:

A straightedge having a sufficient length is contacted or put on a surface to be measured, a previously prepared metallic plate having a small thickness already known is inserted into a gap between the surface and a straight side of the straightedge, and the gap is measured. If the metallic plate is received into the gap, the gap is determined to have a thickness of not less than the thickness of the metallic plate, and previously prepared metallic plates having greater different thicknesses already known are inserted into the gap from one to another until the thickness of the thickest metallic plate that can not be received into the gap is found. Such measurement is carried out at at least four locations, preferably at eight to twelve locations, on a single surface to be measured. When the thickness of the thickest metallic plate that can not be received into the gap between the surface and the straight side of the straightedge on every measuring location is found, that thickness is defined as the flatness D.

In the measurement, consideration is not given to portions of the gap in a range of 10 mm from edges of a surface to be measured. The reason is that when a brick has a surface polished by a diamond polisher and the like, an even surface is formed at a central portion on the polished surface while curved surfaces are apt to be formed at end portions of the surface since the polishing locally develops at the end portions in comparison with the central portion, and that even if local portions of the gap, such as the end portions, have a size of more than 1 mm for instance, it is possible not only to prevent the molten glass from flowing out through a joint as the problem to be solved by the present invention, but also to prevent gaseous or liquid contaminants from mixing with the molten glass through the joint between adjoining bricks as long as the gap between the contacting surfaces of the adjoining bricks is narrow throughout a wide range and the contacting surfaces have a flatness of not greater than 0.5 mm.

In this mode, there are no limitations on the method to use electro-cast refractory bricks (hereinbelow, referred to as the electro-cast bricks) or dense burned refractory bricks (hereinbelow, referred to as the dense burned bricks) to build the paths in series in the forms of the vacuum degassing vessel, the uprising pipe and the downfalling pipe including paths for molten glass G with a circular or rectangular sectional shape and having a certain length as long as the used dense bricks have a flatness of not greater than 0.5 mm on the contacting surfaces. For example, the dense bricks in the shape of a small rectangular parallelepiped may be alternately piled up to provide a rectangular shell having a certain length, the dense bricks having a surface with a certain radius of curvature may be piled up to provide a circular shell having a certain inner diameter and a certain length, or the dense bricks having a short length and a certain diameter and formed in a circular or rectangular shell may be piled up in line to provide a circular or rectangular shell having a certain length.

Figure 3A:
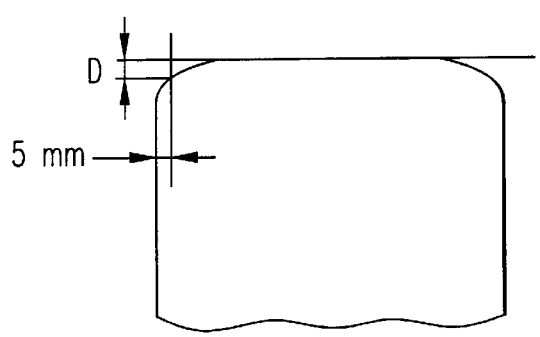
FIG. 3(A) is a schematic view showing the definition of a smoothness D.
Figure 3B:
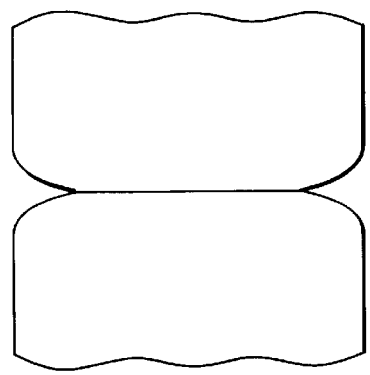
FIG. 3(B) is a cross-sectional view showing a joint in contact with adjoining bricks at a path.
Figure 4:
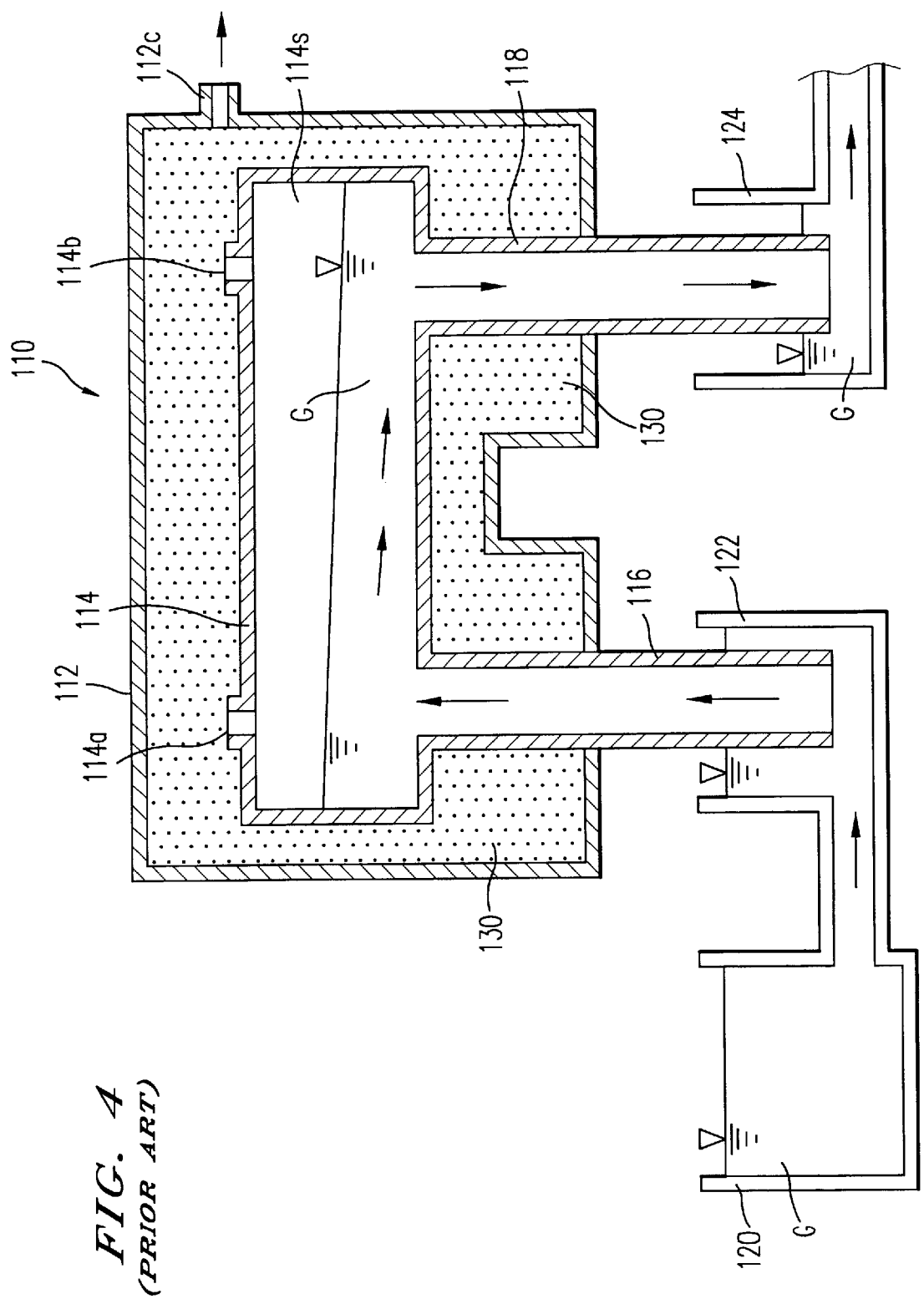
FIG. 4 is a schematic cross-sectional view of a conventional vacuum degassing apparatus for molten glass.

In order to make the contacting surfaces of the dense bricks flat so as to have a flatness of not greater than 0.5 mm, a typical diamond polisher, which can finish as flat as possible on the contacting surfaces, may be utilized. Although there are no limitations on the method to finish flat on the contacting surfaces or the method to polish the contacting surfaces so as to have such a flatness, accurate polishing is recommended. When a brick has a surface polished, edges of the surface are usually apt to be polished to provide the edges with the greatest drop with respect to a central portion of the surface as shown as the sectional shape of a surface of a polished brick in FIG. 3(A). In such a case, the greatest drop that is provided at locations apart from the edges inwardly by 5 mm is determined as the flatness D on that surface. When bricks having such a shape are combined as shown in FIG. 3(B), a quite greatly opened joint is provided between the contacting surfaces of the adjoining bricks, the molten glass G enters the joint to erode the contacting portions, and the molten glass G leaks out of the contacting portions to erode the backup brick layers 32b, 32c and the thermal insulation material 30 behind the bricks. As a result, the backup bricks or the thermal insulation material elutes into the molten glass G to degrade the quality of the molten glass G due to coloration or heterogeneity and to shorten the life of the vacuum degassing vessel 14, the uprising pipe 16 and the downfalling pipe 18, consequently the life of the vacuum degassing apparatus 10 per se, as stated earlier. The pit at each joint is easily enlarged by erosion to occur the convection of the molten glass easily, deteriorating the flow of the molten glass G and consequently lowering the vacuum degassing capacity.

In order to cope with this problem, when the paths in series in the vacuum degassing vessel 14, the uprising pipe 16 and the downfalling pipe 18 are assembled by the bricks, the bricks which have the contacting surfaces polished at the flatness D of not greater than 0.5 mm are brought into surface contact with one another in accordance with the present invention.

The reason why the bricks having the flatness D of not greater than 0.5 mm have the contacting surfaces brought into surface contact with one another to decrease the joint gaps between the contacting portions to a value of 1 mm or lower is that the mutual contact of the contacting surfaces of the bricks without use of joint material allows viscous vitreous substance exuding from the dense bricks at a high temperature to fill the joint gaps having a size of 1 mm or lower, firmly combining the bricks together. In other words, when the molten glass G having a temperature of, e.g., about 1,400° C. flows to heat the bricks to about 1,350° C. or above, the viscous vitreous substance, which has a higher viscosity than the molten glass G, exudes from inner surfaces of the heated bricks, and the vitreous substance covers the joint gaps so as to fill in and bond the joint gaps. Since the vitreous substance that has exuded into the gaps between adjoining bricks stays there and do not flow out of there due to the extremely high viscosity, the vitreous substance can fill the joint gaps in a sufficient way. Even if the molten glass G is to enter a joint gap, the viscous vitreous substance, which has exuded from the bricks, blocks the entering molten glass G to prevent the molten glass from deeply entering the joint, and to prevent the backup bricks or thermal insulation material from being eroded.

When the joint gaps have a size of greater than 1 mm, the viscous vitreous substance, which has exuded from the bricks, can not completely fill the gaps provided between the contacting surfaces, or the viscous vitreous substance flows out to accept the invasion of the molten glass G. From this viewpoint, it is preferable that the irregularities on the contacting surfaces of the bricks are as small as possible, or that the flatness D on the contacting surfaces is as small as possible.

In the first mode of the present invention, the inner surface brick layer (which is indicated by reference numeral 32a in the example shown in FIG. 2(A)), which forms at least each of the paths in series in direct contact with the molten glass G in the vacuum degassing vessel 14, the uprising pipe 16 and the downfalling pipe 18, may have or may not have a backup brick layer 32b or 32c provided therebehind as long as the contacting surfaces of the dense bricks with adjoining dense bricks have a flatness of not greater than 0.5 mm and the gaps between the adjoining dense bricks can be filled with the viscous vitreous substance which has been heated by the molten glass C and has exuded from the dense bricks. The inner surface brick layer may have a single backup layer provided therebehind or may have two or more of backup layers provided therebehind. Although there are no limitations on the bricks that form these backup brick layers, any typical refractory bricks may apply. The bricks are preferably dense bricks similar to the inner surface brick layer 32a in terms of strength and life.

In this mode, when the inner surface brick layer 32a has a backup brick layer 32b or 32c, there may be provided a space between the inner surface brick layer 32a and the backup brick layer 32b or 32c, or there may be provided a space between adjoining brick layers 32a, 32b or 32c, into which filling material, such as ramming material, is filled to provide a filling material layer (a ramming material layer 34a, 34b). There are no limitations on the filling material to be filled in between the adjoining brick layers 32a, 32b or 32c. Conventional filling material, such as known ramming material and known stamping material, or filling material comprising known refractory material may apply.

When the vacuum degassing apparatus 10 according to the first mode of the present invention is built, the inner surface brick layer 32a, which forms at least each of the paths in direct contact with the molten glass G, is constituted by assembling the dense bricks having a flatness of not greater than 0.5 mm on the contacting surfaces. If needed, the backup brick layer 32b or 32c is provided behind the inner surface brick layer. If needed, the filling material, such as ramming material, is filled in between the adjoining brick layers to provide the filling material layer 34a or 34b as the ramming material layer. Thus, the vacuum degassing vessel 14, the uprising pipe 16 and the downfalling pipe 18 are built.

Subsequently, the thermal insulation material 30 is provided outside the vacuum degassing vessel 14, the uprising pipe 16 and the downfalling pipe 18 thus built, and the thermal insulation material has the outer periphery covered by the vacuum housing 12, providing the vacuum degassing apparatus 10. The vacuum degassing vessel 14, the uprising pipe 16 and the downfalling pipe 18 of the vacuum degassing apparatus 10 thus provided are heated to a certain temperature, e.g., a temperature of not less than the temperature of the molten glass G, or the vacuum degassing vessel 14, the uprising pipe 16 and the downfalling pipe 18 are heated by the molten glass G in operation to exude the viscous vitreous substance from the dense bricks as the inner surface brick layer 32a, filling the vitreous substance into between adjoining bricks to fill up the spaces between the adjoining bricks. In this way, the vacuum degassing apparatus 10 is built.

The vacuum degassing apparatus for molten glass and the method for building the apparatus according to the first mode of the present invention are basically as described above.

Next, the vacuum degassing apparatus for molten glass and the method for building the apparatus according to the second mode of the present invention will be described.

In this mode, the apparatus has a three layered structure that includes the inner surface brick layer 32a as a path in direct contact with the molten glass G provided at the innermost position of each of paths in series comprising the vacuum degassing vessel 14, at least one portion of the uprising pipe 16 and at least one portion of the downfalling pipe 18, the first backup layer 32b provided behind the inner surface brick layer (around an outer peripheral surface of the inner surface brick layer), and the second backup layer 32c provided behind the first backup layer (around an outer peripheral surface of the first backup layer), the respective layers being spaced from each other by a certain distance, preferably by 20–50 mm, as shown in the example of FIG. 2 (A). Ramming material is filled into the spaces between adjoining brick layers to provide the ramming material layers 34a and 34b.

In this mode, the refractory brick layers have a multi-layered structure to include the inner surface brick layer 32a and at least one backup brick layer 32b or 32c, and ramming material is filled into between the brick layers to provide the ramming material layer 34a or 34b. This arrangement can prevent the erosion of the thermal insulation material 30 by the molten glass C exuding from the brick layers 32a, 32b or 32c.

In this mode, there are no limitations on the refractory bricks forming the respective brick layers 32a, 32b or 32c as long as the bricks does not cause coloration or heterogeneity in the molten glass G. It is preferable that at least the inner surface brick layer 32a comprises the dense bricks stated earlier. It is the most preferable that all brick layers comprise the dense bricks. In this mode as well, it is preferable that at least the inner surface brick layer 32a has a flatness of not greater than 0.5 mm on the contacting surfaces between adjoining dense bricks, and that the joint gap between the adjoining bricks is 1 mm or lower as in the first mode of the present invention. It is more preferable that the flatness is 0.3 mm or lower, and that the joint gap between the adjoining bricks is 0.6 mm or lower.

In this mode, the provision of at least one backup brick layer 32b or 32c is sufficient though plurality of backup brick layers may be provided. Although it is lo preferable that more backup brick layers are provided to prevent the molten glass G from exuding and to prolong the life of the apparatus, the provision of more backup brick layers increases the weight of the apparatus and enlarge the size of the apparatus. The apparatus may be configured to have a suitable number of the brick layers as needed.

The space between adjoining brick layers preferably has a size of 20–50 mm as stated earlier, more preferably a size of 25–35 mm.

The reason why the space between adjoining brick layers is set at a size of 20–50 mm is that when the space is narrow, the ramming material, which is cold filled in the space as stated later on, can not be filled in the space well closely, that since the ramming material is not filled well closely, the ramming material could solidify, including cavities or bubbles formed during filling, and that the presence of the cavities or the bubbles could lower the function of the ramming material. Another reason is that the thickness of the ramming material is required to be minimized since the ramming material per se is inferior to the dense bricks in terms of mechanical and chemical strength, and that the dense bricks, which form the first backup brick layer 32b and have superior mechanical and chemical strength, are required to be provided so as to contact the molten glass G earlier.

Each of the ramming material layers 34a and 34b to be provided between adjoining refractory brick layers is provided at each of the spaces between adjoining refractory brick layers, or between the brick layers 32a and 32b and between the brick layers 32b and 32c. Since the ramming material layers, which have the dense ramming material filled therein in an extremely dense way, have superior corrosion resistance, the ramming material layers can prevent the molten glass G from leaking through a joint in the respective brick layers 32a, 32b or 32c and from exuding toward behind the respective brick layers.

The ramming material employed in the present invention is one which is obtained by adding a small amount of water to powdery refractory material having a refractory aggregate, a hardening agent, etc. mixed, and kneading the mixture, and then filled, and which is given a ceramic bond by heating, resulting in the improvement of strength. As such ramming material, for example, alumina based ($Al_2O_3$) ramming material, zirconia-silica based ($ZrO_2$—$SiO_2$) ramming material, and alumina-zirconia-silica based (AZS; $Al_2O_3$—$ZrO_2$—$SiO_2$) ramming material may be mentioned. As the preferred specific examples, CMP-AH as the alumina based ones; ZR-2000 as the zirconia-silica based ones; and, as the alumina-zirconia-silica based ones, ZM-2500 (these are manufactured by Asahi Glass Company Ltd.) and Erso 150V (manufactured by SEPR Corp.), may be mentioned. In addition to the above, cement disclosed in JP-B-572666, which comprises an alumina slag of iron manufacturing containing calcium (mono- or di-) aluminate or calcium silicoaluminate as a main component, alkaline earth inorganic material such as calcium (mono- or di) aluminate-type alumina cement or silicoalumina cement or high-temperature burned magnesia, ultrafine powder such as silica, chromium oxide or alumina, and inactive fillers, and which is less in the calcium content and the added water content as compared with conventional ones, and excellent in the heat resistance and the erosion resistance, may be mentioned as an example of the ramming material. Among such ramming material, it is preferred to use castable refractory material called ramcrete, for which a slight amount of binding material comprising active ultrafine powder as a base is used instead of the conventional alumina cement. Further, as particularly effective ramming material, low cement-type ramming material may be mentioned which comprises ultrafine powder as a base, for which very dense packing can be made by the addition of as small as 3 to 6 wt % of water and a vibrator application is employed, and by which excellent properties such as erosion resistance and heat resistance can be obtained. As the preferred example, WHITE RAM (manufactured by Asahi Glass Company Ltd.) may be mentioned.

The reason why such a low water content of from 3 to 10 wt %, preferably from 3 to 6 wt %, is used for kneading the ramming material as compared with the conventional water content for usual castable refractory material of from about 10 to 15 wt %, is as follows. When the water content is evaporated at a high temperature, the low water content is effective to prevent the ramming material from cracking which results in exudation of the molten glass.

Incidentally, it is preferred to employ ramming material, which comprises, as base material, the main components of the bricks used for the paths in series. For examples, when alumina based electro-casting refractory bricks are used, it is preferred to use CMP-AH (manufactured by Asahi Glass Company Ltd.) of an alumina base, or Ergal (manufactured by SEPR Corp.).

After assembling the bricks of each layer in accordance with the above method, as small as from 3 to 6 wt % of water is added to powdery ramming material, and the space between adjoining brick layers is filled with the ramming material, and further a rod-like vibrator is inserted into the space to fill the space with the ramming material densely and uniformly by utilizing a fluidization effect of the powder by vibration. The ramming material is hardened in from 3 to 4 hours, and one day after, the dense ramming material layers 34a and 34b having relatively excellent erosion resistance are formed.

The inner portions of the paths in series in the vacuum degassing vessel 14, the uprising pipe 16 and the downfalling pipe 18 are configured to have a multi-layered sectional structure that comprises the inner surface brick layer 32a, the ramming material layer 34a, the first backup brick layer 32b, the ramming material layer 34b and the second backup brick layer 32c thus provided. It is sufficient that at least portions in direct contact with the molten glass G have the multi-layered sectional structure. It is not required that the ceiling portion of the vacuum degassing vessel 14, which is not in direct contact with the molten glass G, has the multi-layered sectional structure. For example, the ceiling portion of the vacuum degassing vessel 14, which is not in direct contact with the molten glass G, has a monolayered structure that is constituted by dense bricks similar to those used in the bottom portion of the vacuum degassing vessel 14, the uprising pipe 16 and the downfalling pipe 18, which are in direct contact with the molten glass G, in the embodiment shown in FIG. 1.

There are no limitations on the shape of the vacuum degassing vessel 14, the uprising pipe 16 and the downfalling pipe 18 as long as these members are formed in at least a shell-like shape. These members may be formed in a circular shape, an elliptical shape, a square shape, another rectangular shape or another polygonal shape in section.

The thermal insulation material 30, which is provided outside the paths in series in the forms of the vacuum degassing vessel 14, the uprising pipe 16 and the downfalling pipe 18 in the vacuum housing 12 for insulating a high temperature from the molten glass G, is one that has an air-permeable property to provide no bar to evacuation in the vacuum degassing vessel 14. In order to introduce the molten glass G into the vacuum degassing vessel 14 by depressurization for starting the operation of the vacuum degassing apparatus 10, not only the upstream pit 22 but also the downstream pit 24 is required to contain the molten glass G. For this reason, it is preferable that a bypass (not shown) is provided to flow the molten glass G from the upstream pit 22 to the downstream pit 24.

The vacuum degassing apparatus 10 thus configured according to the present invention can increase the degassing throughput since the apparatus can be built in a larger size than the conventional vacuum degassing apparatus with platinum used therein.

The presence of the contacting surfaces of adjoining bricks polished with good precision in the certain range and the provision of the multi-layered sectional structure with the ramming material used therein can remarkably extend the life of the vacuum degassing apparatus 10 per se, eliminate the need for taking into account, in designing, the measures to interrupt production for repairing a path for molten glass, and dispense with troublesome operation required to lift the entire vacuum degassing apparatus for repair. The present invention can install the vacuum degassing apparatus and paths for molten glass connected to upstream and downstream ends thereof in a fixed way.

The present invention can provide the vacuum degassing apparatus 10 with a larger size and a longer life to increase the inlet (introduction) temperature of the molten glass G or the outlet temperature of the melting vessel 20 in comparison with the conventional apparatus, expanding a range to carry out suitable selection according to the kind of the molten glass G to be degassed (the viscosity at a treatment temperature), the throughput of the molten glass, and the material forming the respective portions of the vacuum degassing apparatus 10, e.g., the kind or the size of the material, such as electro refractory material and dense burned refractory material. In consideration of the cost required for heating and dissolution in the melting vessel 20, the degassing efficiency of the vacuum degassing apparatus 10 and the cost required for heating or cooling inside and outside the apparatus, the outlet temperature of the molten glass G at the melting vessel 20 is preferably 1,300–1,550° C., more preferably 1,400–1,550° C. The reason is that it is preferable to have a higher temperature in the melting vessel in order to make glass material react adequately and equally so as to establish a vitreous state most effectively.

There are no limitations on the molten glass G to be dealt with in the vacuum degassing apparatus 10 according to the present invention. Examples of the molten glass are soda-lime glass and borosilicate glass. Since the vacuum degassing apparatus 10 according to the present invention can deal with a large quantity of molten glass, the apparatus is suited to deal with soda-lime glass, which is required to be dealt with in a large quantity.

The vacuum degassing apparatus for molten glass according to the present invention, which is basically configured as stated earlier, will be described in terms of operation.

First, before starting the operation of the vacuum degassing apparatus 10, the molten glass in the melting vessel 20 is introduced into the vacuum degassing apparatus 10, specifically the molten glass is introduced from the upstream pit 22 into the downstream pit 24 by opening the bypass, not shown, and lower portions of the uprising pipe 16 and the downfalling pipe 18 are immersed in the molten glass G. After completion of immersion, the vacuum pump, not shown, is driven to evacuate the vacuum housing 12 through the suction port 12c and consequently evacuate the vacuum degassing vessel 14 through the suction ports 14a and 14b, depressurizing the inside of the vacuum degassing vessel 14 to a pressure of $\frac{1}{20}$–$\frac{1}{3}$ atmosphere.

As a result, the molten glass G is drawn up in the uprising pipe 16 and the downfalling pipe 18 to be introduced into the vacuum degassing vessel 14, and the molten glass is accumulated at a certain depth in the vacuum degassing vessel 14 to bring a level difference H in the molten glass G between the melting vessel 20 and the vacuum degassing vessel 14 to a certain value and to provide an upper evacuated space 14s. After that, the bypass is closed.

After that, the molten glass G passes from the melting vessel 20 into the uprising pipe 16 through the upstream pit 22, is drawn up in the uprising pipe and is introduced into the vacuum degassing vessel 14. The molten glass G is vacuum-degassed under the certain depressurizing condition, flowing through the vacuum degassing vessel 14. Specifically, in the vacuum degassing vessel under the certain depressurizing condition, the bubbles in the molten glass G are rising in the molten glass G, are blocked by the barriers 32a, 32b and break there, or the bubbles further rise into the upper space 14s and break there. Thus, the bubbles are removed from the molten glass G.

The degassed molten glass G is discharged from the vacuum degassing vessel 14 into the downfalling pipe 18, is drawn down in the downfalling pipe 18 to be introduced into the downstream pit 24, and is discharged from the downstream pit 24 to the subsequent treatment vessel (e.g. the forming treatment vessel), not shown.

The present invention can increase the degassing throughput and make use of the sensible heat of the molten glass G. As a result, the heating of the molten glass G in degassing, which has been required, can be eliminated to dispense with a heating device for the molten glass during degassing.

The vacuum degassing apparatus for molten glass according to the present invention may be applied to not only the siphon vacuum degassing apparatus shown in FIG. 2 but also horizontal vacuum degassing apparatuses as shown in JP-A-5262530 and JP-A-7291633.

Although explanation of the vacuum degassing apparatus for molten glass according to the present invention has been made, referring to the embodiment, the present invention is not limited to the embodiment. It is apparent that within the scope of the invention, modifications and changes in design can be made other than as herein disclosed.

As explained in detail, the present invention provides the vacuum degassing apparatus which has the paths of the vacuum degassing vessel, the uprising pipe and the downfalling pipe built by assembling bricks made of dense refractory material, such as electro-cast refractory material and dense burned refractory material, which is inexpensive than noble metal, such as platinum and platinum alloy, and can continuously vacuum-degas molten glass as in the case of building the paths by the use of noble metal alloy, wherein the contacting surfaces of the adjoining bricks in the inner surface brick layer which forms the paths in direct contact with the molten glass of the vacuum degassing vessel, the uprising pipe and the downfalling pipe are polished with good precision in the certain range and are contacted one another, or the paths in direct contact with the molten glass of the vacuum degassing vessel, the uprising pipe and the downfalling pipe have the multi-layered sectional structure that comprises the plural brick layers and the ramming material layer provided therebetween and filled with the ramming material. This arrangement prevent the molten glass from exuding to erode or dissolve the backup brick layer or the thermal insulation (bricks) behind the inner surface brick layer, can eliminate the coloring or the heterogeneity of the molten glass, and can extremely extend the life of the vacuum degassing apparatus. As a result, the measures to interrupt the production for repairing the paths for molten glass are not required to be taken into account in designing. The building cost lowers in comparison with the case with noble metal, such as platinum and platinum alloy, used. It is not necessary to limit the use of the material in terms of cost and restrict the size of the apparatus in terms of an decrease in the strength caused by the limited use of the material, remarkably improving the degree of freedom in design. Since the convection of the molten glass caused by the erosion at the joints is eliminated, the degassing treatment can effectively carried out, and impurities caused by the erosion can be prevented from mixing into the molten glass, not only putting the vacuum degassing treatment in a large quantity into practice but also enabling the vacuum degassing treatment at a higher temperature.

What is claimed is:

1. A vacuum degassing apparatus for molten glass, comprising:
    a vacuum housing which is evacuated to be depressurized therein;
    a vacuum degassing vessel which is provided in the vacuum housing to vacuum-degas molten glass;
    an uprising pipe which connects to the vacuum degassing vessel, and sucks and draws up undegassed molten glass to introduce the undegassed molten glass into the vacuum degassing vessel; and
    a downfalling pipe which connects to the vacuum degassing vessel and draws down the degassed molten glass from the vacuum degassing vessel to discharge the degassed molten glass;
    wherein paths in direct contact with the molten glass are made of assembled dense refractory bricks, the paths providing the vacuum degassing vessel, at least one portion of the uprising pipe and at lease one portion of the downfalling pipe, and the bricks have a flatness of not greater than 0.5 mm on contacting surfaces with adjoining dense refractory bricks.

2. A vacuum degassing apparatus for molten glass, comprising:
    a vacuum housing which is evacuated to be depressurized therein;
    a vacuum degassing vessel which is provided in the vacuum housing to vacuum-degas molten glass;
    an uprising pipe which connects to the vacuum degassing vessel, and sucks and draws up undegassed molten glass to introduce the undegassed molten glass into the vacuum degassing vessel; and
    a downfalling pipe which connects to the vacuum degassing vessel and draws down the degassed molten glass from the vacuum degassing vessel to discharge the degassed molten glass;
    wherein each of the vacuum degassing vessel, at least one portion of the uprising pipe and at lease one portion of the downfalling pipe includes an inner surface brick layer made of assembled dense refractory bricks and forming a path in direct contact with the molten glass, at least one backup brick layer provided behind the inner brick layer and made of assembled refractory bricks, and a ramming material layer provided in at least a space between the inner surface layer and the backup brick layer adjoining thereto and filled with ramming material.

3. The apparatus according to claim 2, wherein at least a space between the inner surface brick layer and the backup layer adjoining thereto has a size of 20–50 mm.

4. The apparatus according to claim 2, wherein the inner surface brick layer and the at least one backup brick layer are made of the bricks assembled so that joints with adjoining bricks in one brick layer do not overlap with joints with adjoining bricks in the other brick layer by a length greater than that of the joints in the other brick layer.

5. The apparatus according to claim 2, wherein the ramming material is at least one or a mixture of two among alumina based ramming material, zirconia-silica based ramming material, and alumina-zirconia-silica based ramming material.

6. The apparatus according to claim 2, wherein the bricks in the inner surface layer have a flatness of not greater than 0.5 mm on contacting surfaces with adjoining dense refractory bricks.

7. A method for building a vacuum degassing apparatus for molten glass, comprising:
    a vacuum housing which is evacuated to be depressurized therein;
    a vacuum degassing vessel which is provided in the vacuum housing to vacuum-degas molten glass;
    an uprising pipe which connects to the vacuum degassing vessel, and sucks and draws up undegassed molten glass to introduce the undegassed molten glass into the vacuum degassing vessel; and
    a downfalling pipe which connects to the vacuum degassing vessel and draws down the degassed molten glass from the vacuum degassing vessel to discharge the degassed molten glass;
    wherein each of paths in series that comprise the vacuum degassing vessel, at least one portion of the uprising pipe and at lease one portion of the downfalling pipe is provided by polishing contacting surfaces of dense refractory bricks with adjoining dense refractory bricks to provide a flatness of not greater than 0.5 mm on the contacting surfaces, assembling the polished bricks to provide each of the paths in direct contact with the molten glass as the vacuum degassing vessel, the at least one portion of the uprising pipe and the at least one portion of the downfalling pipe, heating the paths to a certain temperature to exude vitreous substance from the dense refractory bricks, and filling spaces between the contacting surfaces of the adjoining bricks with the vitreous substance.

8. A method for building a vacuum degassing apparatus for molten glass, comprising:
    a vacuum housing which is evacuated to be depressurized therein;
    a vacuum degassing vessel which is provided in the vacuum housing to vacuum-degas molten glass; an uprising pipe which connects to the vacuum degassing vessel, and sucks and draws up undegassed molten glass to introduce the undegassed molten glass into the vacuum degassing vessel; and
    a downfalling pipe which connects to the vacuum degassing vessel and draws down the degassed molten glass from the vacuum degassing vessel to discharge the degassed molten glass;
    wherein among paths in series which comprise the vacuum degassing vessel, at least one portion of the uprising pipe and at lease one portion of the downfalling pipe, portions of the paths in direct contact with the molten glass are provided with an inner surface brick layer made of assembled dense refractory bricks, at least one backup brick layer made of assembled refractory bricks is provided behind the inner surface brick layer so as to be spaced from the inner surface brick layer by a certain distance, and ramming material with a small amount of water kneaded therewith is filled in at least a space between the inner surface brick layer and the backup brick layer, being subjected to vibration by a vibrator.

9. The method for building a vacuum degrassing apparatus according to claim 8, wherein the inner surface brick layer is provided by polishing contacting surfaces of the dense refractory bricks with adjoining dense refractory bricks to provide a flatness of not greater than 0.5 mm on the contacting surfaces, assembling the polished bricks to provide each of the paths in direct contact with the molten glass as the vacuum degassing vessel, the at least one portion of the uprising pipe and the at least one portion of the downfalling pipe, heating the paths to a certain temperature to elute vitreous substance from the dense refractory bricks, and filling spaces between the contacting surfaces of the adjoining bricks with the vitreous substance.

* * * * *